Oct. 21, 1941.　　C. M. BLODGETT　　2,259,434
PICTURE FRAME
Filed Feb. 29, 1940
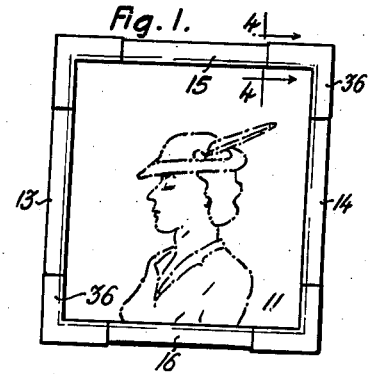
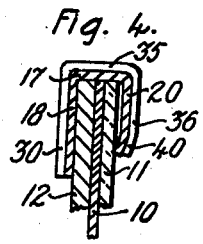
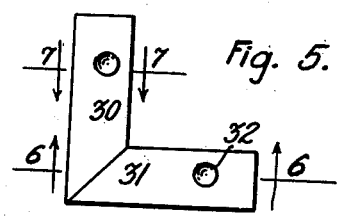
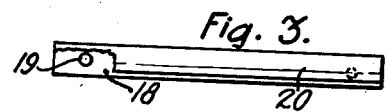
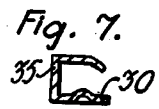
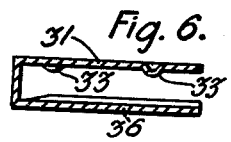
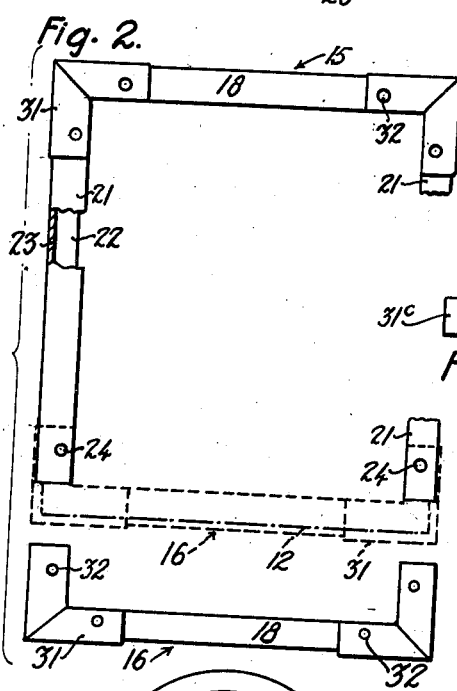
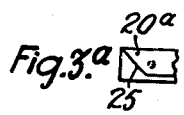
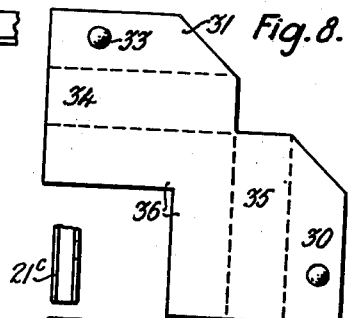
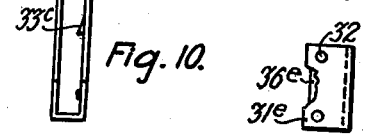
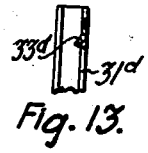
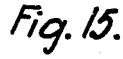
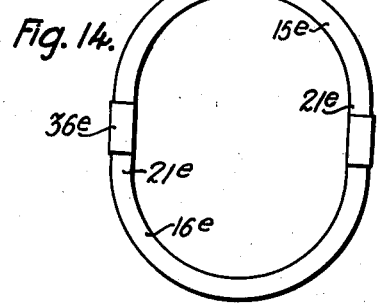
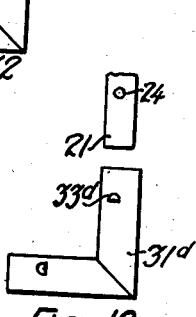
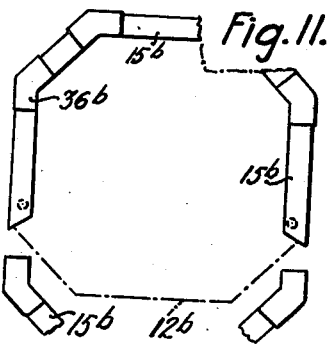
INVENTOR.
CLARENCE M. BLODGETT;
By _____, ATTORNEY.

Patented Oct. 21, 1941

2,259,434

UNITED STATES PATENT OFFICE 2,259,434

PICTURE FRAME

Clarence M. Blodgett, New York, N. Y.

Application February 29, 1940, Serial No. 321,416

4 Claims. (Cl. 40—154)

This invention relates to picture representations in various forms, such as prints, manuscripts, images, and has in the several aspects thereof particular reference to frames therefor.

One of the objects of the invention is the provision of an organization in which the constituent elements are so arranged structurally and functionally as to assure improved results with relatively inexpensive material which is easy to manufacture, and which may indefinitely retain its serviceable qualities.

Features of the invention, connected with the foregoing, reside in coacting frame parts in which are provided integral joining means, said parts including two or more elongate, channel, framing strips or members, and one or more union, clamping or joining members, said members, even with use of a minimum thereof, in the formation of any one frame, being effective to complete the frame, without additional elements or parts.

In the preferred embodiment of the invention, in accordance with another of its objects, the frame includes straight boundary flanged side and end members, each having in one of the flanges thereof at each of its ends an aperture, and angle members or sockets forming flanged clamping parts, said parts having, also in one of the flanges thereof, and in its opposite ends, integral bosses, which latter cooperate holdingly in said apertures, in the assembled position of said frame members.

Another object of the invention is to provide a built up frame of this type, in which the co-operating members are joined tightly in parallelism, in such manner as to prevent sagging of the frame, or separate oblique or undesirable movement of the respective members.

With structures substantially of the type herein disclosed, combined with a methodical manner of assembly, and in accordance with yet another object of the invention, it follows that economy of time, as used in the framing operation, is involved, since assembly, at least as in the case of framing pictures or the like which are in the range of medium, small or usual size, is also effected with practically no assembling tools. Such assembly, moreover, may be performed by a store keeper, or clerk, when the parts are shipped separately, as in bulk, by the manufacturer.

With the above indicated objects and advantages in view, as well as others which will hereinafter appear, the essential features of the present improved constructions are herein clearly described, and illustrated in the accompanying drawing, in which;

Fig. 1 is a front view on a small scale of a picture frame mounted on a conventional picture and constructed in accordance with the present invention.

Fig. 2 is an enlarged, fragmentary back view, in which a certain assembly step is represented.

Fig. 3 is a front view of a straight side member per se.

Fig. 3a is a view similar to part of Fig. 3, but showing a slight modification.

Fig. 4 is an enlarged section on the line 4—4, Fig. 1.

Fig. 5 is a plan view of the back of a corner member per se.

Figs. 6 and 7 are horizontal sections on the lines 6—6 and 7—7, respectively, of Fig. 5.

Fig. 8 is a plan view of the inner side of a blank from which a corner member is formed.

Fig. 9 is a view similar to part of Fig. 2, but showing a modification of structure.

Fig. 10 is an edge view of the parts shown in Fig. 9.

Fig. 11 is a fragmentary front view of a further modified structure.

Fig. 12 is a back view of another modified form of corner clamp.

Fig. 13 is an edge view, partly sectional and fragmental, of the structure shown in Fig. 12.

Fig. 14 is a front view of another modified form of picture frame; and

Fig. 15 is a fragmentary back view of structure shown in Fig. 14.

Mounted on conventional parts, which include, as shown in said drawing, having reference to Fig. 4, a picture sheet 10, a glass front or transparency 11, and a backing 12, is a frame having substantially like, straight, sheet metal, side channel members 13, 14, and like end or top and bottom sheet metal, channel members 15, 16.

The top member 15 includes a flange structure having a medial web portion 17, a back, flat flange 18, in opposite ends of which are like apertures 19 (Fig. 3), and a front flange 20, in the present instance having a slightly inwardly turned or beveled margin, as shown.

The end member 16 is similar to the member 15, so that a description of one is equally applicable to the other, and the straight side member 13, for example, and the member 14, having a flat back flange 21 (Fig. 2), a front flange 22, and a joining web 23, are also substantially alike. Since the flanges and webs of the end members, as 15, are formed to register with the flanges and webs of the side members, as 13, it follows that the cross sectional formation of the parts 21, 22, 23 of said member 13 are the same as the cross sectional parts 17, 18, 20, Fig. 4, and the front flanges 22 of said side members are also beveled or slightly turned inwardly throughout their length. The end apertures 24, also each alike, in the back flanges 21 of the side members 13, 14, are similar to the apertures 19, and it will hereinafter be seen that said webs 17, 23 closely engage registering edge faces of the picture sheets 10—12.

As shown in Fig. 3a, the modified structure is identical with Fig. 3, except that, in the latter, the edges of the flanges 18, 20 are right angular at their ends, relative to the longitudinal line of the side flanges, whereas in the modification, a front flange 20a is provided with an inclined end edge 25, an end portion, in other words, being cut away. The cut away corners, exposing corresponding portions of the back flanges, give advantageous functions in the assembling operation, but the result and outward appearance, in the finished device, are the same in both cases.

The space between the front flanges 20, 22 and the back flanges 18, 21, at the inner edges thereof, is such that these flanges closely, resiliently, as for purposes of assemblage, engage the margins of the picture sheets 10–12. In some cases, the ends of the flanges, as 21, 22, of the sides 13, 14, may first be mounted or engaged at opposite corner portions of the sheets 11, 12. Said sides are then moved slidably endwise until they become engaged throughout their length on the sheets. Also in some cases, the flanges, as 18, 20, of end members may be engaged throughout their length, at the same time, completely across the sheet members. This latter form of assemblage is rendered convenient because the back flanges at their inner margins project farther inwardly than the front or beveled flanges. When the edge portions of the sheet members, as 11, 12, are first disposed on said projecting margins, any instrument, such as a piece of thin sufficiently rigid sheet material, may be used to aid in the insertion. Assemblage of straight frame members, with coacting pairs of corner sockets thereon, is further hereinafter referred to.

The corners, or corner sockets, also each alike, and each including flat back flange segments 30, 31, are likewise of sheet metal of suitable resiliency. Struck into, or otherwise formed in one side of said segments are recesses 32, thereby forming on the other side bosses 33, also each alike, and each adapted to fit into an aperture 19 or 24. The bosses thus formed have suitably inclined sides or boundaries entirely therearound, so that, by virtue of said bosses, the opposed flanges of the corner members spring apart, as when mounting the same on the end of a straight side member, said bosses being then adapted to snap into and holdingly fit in the apertures.

The contour of the slopes of the annular bosses 33 determine the extent of their gripping effect in the apertures of the straight members. When said slopes are gradual, a corner clamp may be removed from a cooperating frame member by the application of sufficient pulling force, as manually, but when said slopes are more pronounced, or more nearly vertical to the flange surface, such removal becomes more difficult, and permanent locking together of the respective corner and straight members is provided for and hereinafter described. Instead of a socket being slidable endwise onto a straight member, the flanges, as 30, 36, of the socket may be urged over the outer web portion of the straight member, thus directly to engage a boss 33 in an aperture 19 or 24.

A corner clamp is formed by first striking out a blank, as shown in Fig. 8, having two web elements 34, 35, and one continuous front part 36, having two portions, as shown, said portions being also beveled, as at 40, to correspond with and fit closely over end portions of the beveled flanges of the side and end members 13—16.

On viewing the drawing it becomes clear that, on the dash lines shown, when the blank is folded or bent into the erect position, the ends of the webs 34, 35 closely engage, as do the oblique end edges of the segments 30, 31 (Fig. 5), the clamp portions being then strongly held together owing to the unitary part 36, with its two continuous portions aforesaid.

A corner clamp, instead of having projections, may have apertures 24, in which case a straight member, as 21, may have projections, as 33, which latter then point outwardly through the apertures.

According to one method of assemblage, having reference to Fig. 2, the opposite ends of a straight member 15 are urged into ends of two corner sockets, to snap the bosses of these two corner ends into apertures 19 of said member. Then the opposite ends of these two sockets receive therein ends of two side members 13, 14, thus forming three sides of the frame, which is slidably moved onto three sides of the picture members, as hereinbefore described, a lowermost edge 12 of said picture members, after this sliding movement, being represented in dot-and-dash lines.

Near said edge 12, Fig. 2, is shown in full lines another end member 16, with its flange 18, on the ends of which are assembled two other corner members. Then the member 16, with its sockets, is moved into the dash line position, thus to complete the frame on the picture sheets.

Various forms of frames according to this invention may thus be mounted on picture sheet assemblies, and in Fig. 11 are shown frame members suitable for being mounted on picture sheets of octangular outline. In this embodiment eight straight members 15b, each alike, have their ends mounted in certain sockets 36b, the angles of the ends of which, as shown, are adapted to correspond with those of the picture sheets. A picture sheet assembly is here represented at 12b, and the lowermost members, fragmentally shown, are ready to be urged onto the members forming the upper half of the frame. The sockets 36b, except for the angles of their ends, are like the sockets first described above.

In Figs. 9, 10 is shown a modified structure which includes a socket having a back flange formation 31c, from which limitedly inwardly projects one end of an integral spring tongue or stud 33c, said end having a stop face, as shown, vertical to the flange surface and, at the other end of the tongue, a gradually inclined part, so as to facilitate telescoping, interlocking action of the members concerned. Flanges, as 21c, have therein rectangular apertures 24c, and a member having therein angular apertures is urged at an end thereof into a socket 31c, to result in a permanently locked engagement. As a tongue 33c snaps into an angular aperture, the aforesaid stop face engages a boundary face of the aperture, and it is impossible, in this case, to disconnect the intact assemblage.

Another modified form of locking means is shown in Figs. 12, 13. In this modification, a straight member including a flange 21 may have a circular aperture therein, and with said member a socket having a flange formation 31c cooperates. This latter socket has struck into it a semicircular recess, the straight portion of which is cut through the stock, to produce a locking stud 33d. When the socket 31d is moved onto the member 21, the stud 33d, having the straight face shown, snaps into an aperture 24 and becomes permanently locked therein.

In Fig. 14 are shown straight sockets, each having a front flange 36e. A straight socket has therein (Fig. 15) recesses 32, so as to form bosses, as in the first embodiment. The showing of this modification includes an oval frame having two arcurate segments 15e, 16e, the ends 21e of which are however straight, and provided with apertures 24. The frame of this modification is suitable for mounting on an oval picture sheet assembly.

Variations other than those specified may be resorted to within the scope of the invention and parts of the improvements may be used without others.

I claim:

1. A picture frame comprising angularly positioned straight metal members including flat medial portions for engaging the edge faces of picture sheets, front and back flanges extending from said portions for engaging the margins of the outer sheets, each back flange having in each of its ends an aperture, metal clamps having angularly disposed ends including medial portions and front and back flanges which engage the respective portions and flanges of said members, studs projecting inwardly from the back clamp flanges and lockingly disposed in said apertures, said studs having inclined faces at one of the sides thereof, the clamp flanges being resilient, so that the inclined faces may allow of sliding the clamps over the ends of said members, and flat faces on the opposite sides of the studs, said latter faces being disposed at right angles to the faces of the flanges, the angular faces being also disposed against portions of the boundary faces of said apertures.

2. In a picture frame, pairs of elongate channel shaped members and pairs of socket channel shaped members having integral fastening means, the elongate members including front and back spring constructed flanges and the socket members including ends having front and back spring constructed flanges embracing the ends of the first flanges, the back flanges of one of said pairs having therein apertures and the back flanges of the other pairs having thereon and projecting into the apertures latching portions.

3. A picture frame comprising boundary members of spring sheet metal having adjoining ends and each member including a web with front and back flanges for embracing a marginal portion of a picture sheet assembly, each back flange having adjacent each end thereof an aperture, clamping members also of spring sheet metal and having webs and flanges for closely embracing the webs and flanges of said adjoining ends, the clamping members thereby forming double ended sockets, whereby the ends of the flanges of the boundary members may be contracted and the ends of the flanges of the sockets expanded so as to telescopically engage the respective member ends, the back flanges of the sockets having thereon bosses for lockingly snapping into said apertures.

4. In a picture frame having a pair of channel shaped sheet metal members, for gripping side portions of a picture sheet group, the latter having a flat edge face, the web portions of said members being adapted to engage the flat face, said members including front flanges and back flanges, each back flange having near its end an aperture, a channel shaped clamp element or clamp also of sheet metal and having opposite ends embracing the ends of said members, the clamp having its web engaging said web portions, the back flanges of the clamp having their innermost edges registering with the edges of the back flanges of said members, the last mentioned edges being straight throughout their length, the front flanges of the clamp also having their innermost edges registering with the innermost edges of the flanges of said members, and integral projections formed on the back flanges of said clamp and disposed in said apertures.

CLARENCE M. BLODGETT.